United States Patent
Bhatt et al.

(10) Patent No.: US 12,335,445 B2
(45) Date of Patent: Jun. 17, 2025

(54) SYSTEMS AND METHODS FOR SCANNING DOCUMENTS TO A COLLABORATIVE CLOUD SYSTEM

(71) Applicant: OPEN TEXT HOLDINGS, INC., Menlo Park, CA (US)

(72) Inventors: Rakesh Babulal Bhatt, Castle Pines, CO (US); Frank Wang, Fremont, CA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

(21) Appl. No.: 18/363,056

(22) Filed: Aug. 1, 2023

(65) Prior Publication Data

US 2025/0047792 A1 Feb. 6, 2025

(51) Int. Cl.
| | |
|---|---|
| H04N 1/00 | (2006.01) |
| G06F 9/54 | (2006.01) |
| G06F 16/14 | (2019.01) |
| G06F 40/279 | (2020.01) |
| H04L 9/40 | (2022.01) |
| H04L 67/1097 | (2022.01) |

(52) U.S. Cl.
CPC ......... *H04N 1/00228* (2013.01); *G06F 9/547* (2013.01); *G06F 16/14* (2019.01); *G06F 40/279* (2020.01); *H04L 63/08* (2013.01); *H04L 67/1097* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2013/0212211 A1* | 8/2013 | Maigatter | G06T 11/60 709/217 |
| 2014/0181089 A1* | 6/2014 | Desmond | G06F 16/5866 707/722 |
| 2018/0232282 A1* | 8/2018 | Danilov | G06F 3/0689 |
| 2018/0285321 A1* | 10/2018 | Antony | G06V 30/153 |
| 2020/0210383 A1* | 7/2020 | Demaris | G06F 16/168 |

* cited by examiner

*Primary Examiner* — Jacky X Zheng
(74) *Attorney, Agent, or Firm* — Sprinkle IP Law Group (57) ABSTRACT

Systems, methods and products for uploading scanned documents for collaboration. A user chooses, prior to uploading a document, whether the user wishes for the document to be converted to a text-searchable PDF and/or processed to recognize objects in the image. When the document is scanned, it is uploaded to the cloud based system with the user-selected options, and the PDF/image is processed. The upload may be a multipart, parallel upload to increase the speed of the upload. When the PDF/image is received at the cloud based system, it is processed according to the user-selected options to generate metadata (text or recognized objects) which is stored with the uploaded document. The PDF/image and metadata are shared with users who can then search the metadata for the PDF/image.

20 Claims, 4 Drawing Sheets

SYSTEMS AND METHODS FOR SCANNING DOCUMENTS TO A COLLABORATIVE CLOUD SYSTEM

TECHNICAL FIELD

The invention relates generally to computing systems and more particularly to systems and methods for efficiently and automatically uploading and processing documents for storage in a cloud based data storage system.

BACKGROUND

Many computing services are now widely available using distributed systems that are commonly referred to as "cloud" services. Cloud computing systems may use many different physical components which may be at different locations and which are interconnected to provide on-demand access (typically through a subscription) via the internet to the various available computing resources. These resources may include, for example, applications, servers (physical and virtual), data storage, and the like.

One common use of cloud systems is for data storage. Enterprises, for example, may have very large amounts of data that must be stored. This data may include data that is generated in the operation of the enterprise, as well as copies of documents that may be obtained in the course of business operations (e.g., invoices, agreements, etc.), Physical copies of documents may therefore have to be scanned and uploaded to the enterprise's cloud storage.

Conventional technologies are available to allow the scanning and uploading of physical copies of documents. For example, a scanner may scan a document and produce a PDF image of the document. The PDF file can then be uploaded to the cloud storage. These conventional systems, however, have some shortcomings. For instance, when a document is scanned to a PDF, the resulting PDF is an image and cannot be searched for the text that is contained in the image. If a searchable file is desired, a user must then process the PDF image with optical character recognition (OCR) software to generate a searchable PDF. The searchable PDF can then be uploaded to the cloud storage.

Even the upload of the searchable PDF document can be problematic, however, as many cloud storage services are limited in the size of the documents that can be uploaded. If a user attempts to upload a document that exceeds these limits, the upload may not be allowed, or it may be terminated after it has begun.

It would therefore be desirable to provide systems and methods for resolving one or more of these problems.

SUMMARY

The present disclosure details systems, methods and products for uploading scanned documents to a cloud based storage system which in some embodiments is part of a cloud based collaboration system, where a user can choose, prior to uploading a document, whether the user wishes for the document to be converted to a text-searchable PDF or processed to recognize objects in the image. When the document is scanned, it is uploaded to the cloud based system with the user-selected options, and the PDF is processed. The image generated from the scanned document is, in some embodiments, uploaded using a multi-part upload process in which the image is divided into multiple which are then uploaded to the cloud based system in parallel in order to increase the speed of the upload. When the parts of the image are received at the cloud based system, they are reassembled into the original image and are processed according to the user-selected options. The additional data generated by the processing (recognized text or objects) is stored with the uploaded document, either as metadata stored in the document itself, or as one or more separate files that are associated with the uploaded document.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Figure 1:
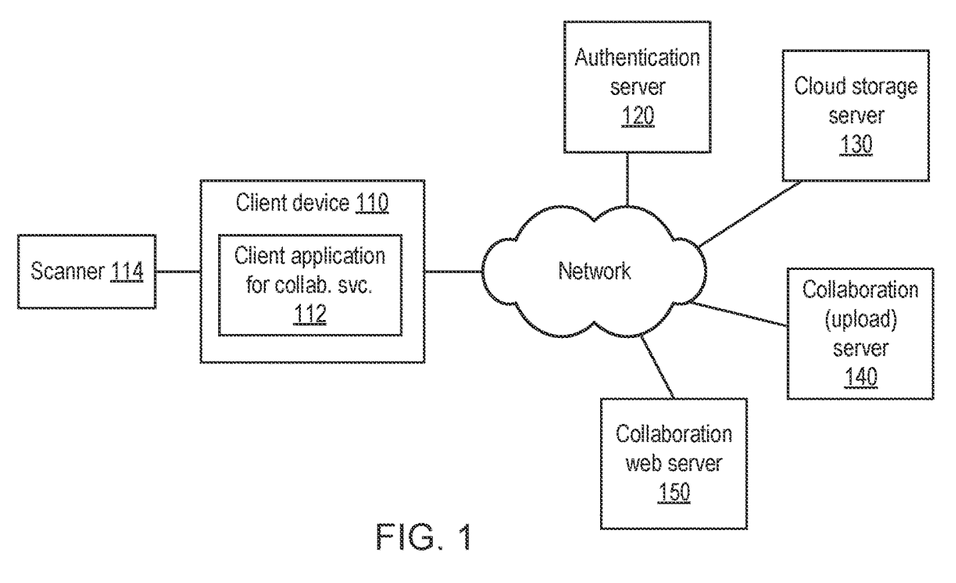
FIG. 1 is a diagram illustrating a system for scanning, uploading and processing documents in accordance with some embodiments.

Referring to FIG. 1, a diagram illustrating a system for scanning, uploading and processing documents in accordance with some embodiments is shown. As depicted in this figure, a client device 110 is connected to scanner 114. When documents are scanned by scanner 114, a corresponding image of the document is output by the scanner and provided to client device 110. The image is output from the scanner as a digital file.

Typically, the image will be a PDF image, although different types of images (e.g., .jpg, .png, .tif, etc.) may be generated in other embodiments. For the purposes of brevity and clarity, the description that follows will focus on generated PDF documents, but references to PDF's should be construed broadly to cover any suitable type of image that may be generated by a scanner and uploaded to a cloud based storage (e.g., a cloud based repository).

In a conventional system, there are four separate steps that are required to upload a searchable PDF (or other scanned image) of a document to a cloud based storage so that it can be accessed by users for collaboration. First, the document must be scanned and the generated digital file must be loaded onto a user's computer. The user must then run OCR software to recognize text in the file and store the text with the digital file. Then, the digital file with the text must be uploaded to the cloud storage. Finally, the digital file stored on the cloud storage must be shared with the users who will collaborate using the file. In addition to In the present embodiments, however, client device 110 has a client application 112 executing thereon. Client application 112 may, for example, provide an interface to a cloud based collaboration service to which the image may be uploaded. Client application 112 may provide, through this interface, access to services including authentication services provided by server 120, data storage services provided by server 130, upload services provided by server 140 and collaboration services provided by server 150. Since the client application is used to upload images generated from scanned documents, the client application may be referred to as an upload application, or an upload app.

Client application 112 may interact with authentication server 120 to authenticate the user of the client application to access the services of the client application, as well as the services of storage server 130, upload server 140 and web server 150. When the user has been authenticated, client application 112 may be used to initiate a scan of a document using scanner 114.

When scanning a document through client application 112, the user provides input to the application indicating whether to recognize text in the scanned document or recognize images in the scanned document. The user may also input collaboration information, such as users with whom the scanned document will be shared after it is uploaded. The user then initiates the scanning of the document through the client application. When the document is scanned by scanner 114, the image generated by the scanner is provided to client application 112. Client application 112 then initiates a multipart upload of the received image to the cloud storage server 130. This involves dividing the image into multiple parts (also referred to herein as "chunks") and concurrently uploading the parts in parallel to the cloud storage server. The transmitted parts of the image are then reassembled and stored as a single image on the cloud storage server.

In addition to uploading the image, client application 112 sends the processing options previously selected by the user to the upload services server 140. Based on the user selections, upload services server 140 accesses the uploaded image in cloud storage server 130 and processes the image to recognize text, or objects, or both in the image. Upload services server 140 stores the resulting information (i.e., the text or objects recognized in the image) with the image in the cloud storage server. This information may be stored in the same file as the image (i.e., as metadata of the image), or it may be stored separately in a file associated with the image. The stored image and the corresponding recognized text/objects are then available to users through the collaboration services of web server 150.

Figure 2:
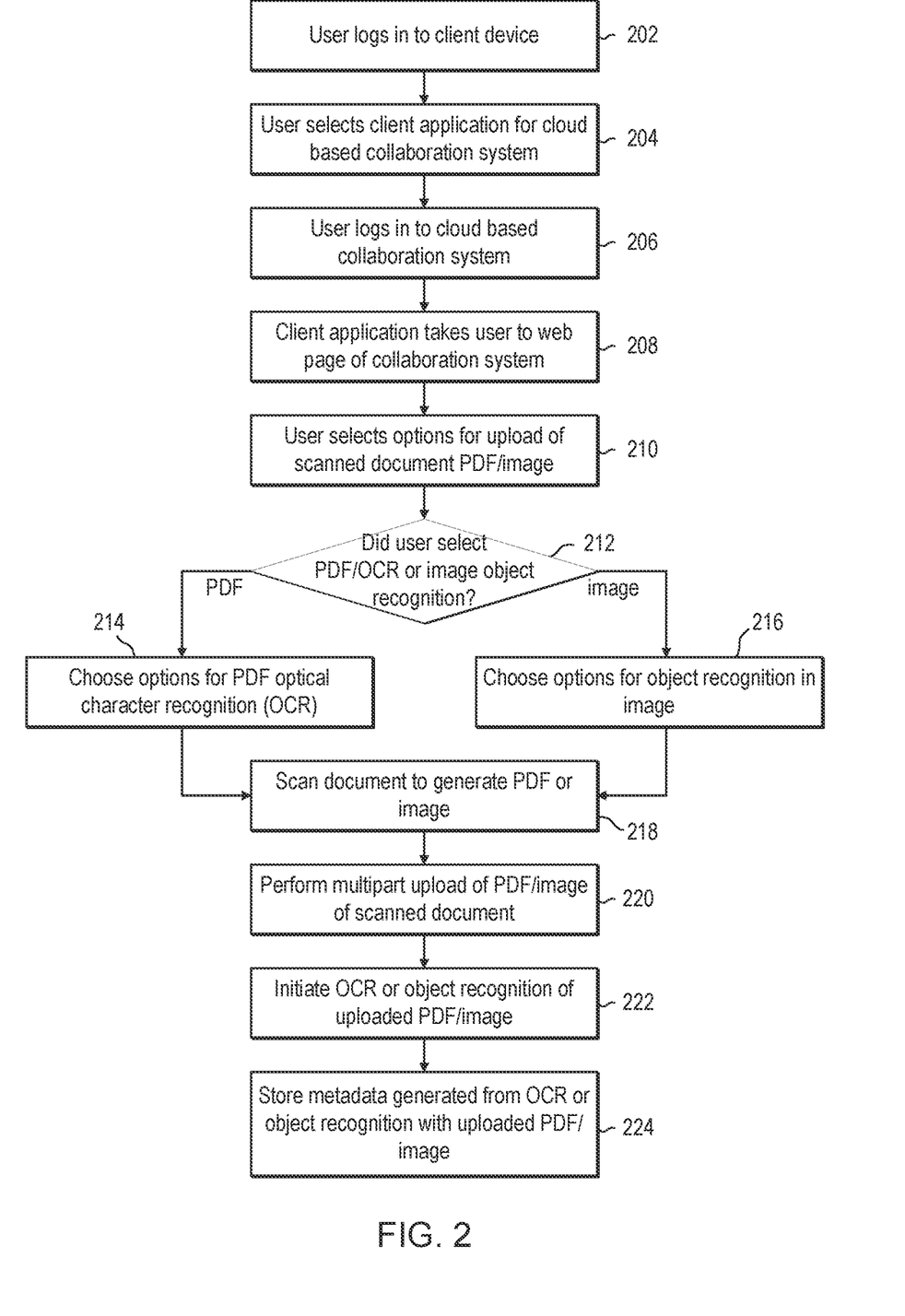
FIG. 2 is a flow diagram illustrating a method for uploading a document to a file that is searchable for text or objects in accordance with some embodiments.

Referring to FIG. 1, a flow diagram illustrating a method for uploading a document to a file that is searchable for text or objects is shown. In this method, the user initially logs into a client device (step 202) and selects a client application for a cloud based collaboration system (step 204). Then, through the client application, the user logs into the cloud based collaboration system (step 406). After the user is authenticated, the application takes the user to a web page of the collaboration system (step 408).

The web page presents the user with an interface that prompts the user to choose an option for a document upload (step 410). In this embodiment, the user is allowed to choose between a PDF which will be processed to recognize text within the PDF, or an image which will be processed to recognize objects within the image. If, at step 414, the user has selected the PDF option, the user will be prompted to select one or more options for performing OCR on the generated PDF (step 412). If, at step 414, the user has selected the image option, the user will be prompted to select one or more options for performing object recognition on the image (step 416).

After the appropriate options have been chosen for the PDF or image of the document (at steps 414 or 416), the document is scanned (step 418). The scanning can be performed by any suitable scanner. For example, the scanner could be a multifunction printer/scanner which is directly connected to the device running the client application, a dedicated scanner connected to the client device via a network, or any other scanning device that is capable of providing an image of the scanned document to the client application.

After the document has been scanned, the resulting image is uploaded to a cloud based storage of the collaboration service (step 220). As noted above, in some embodiments, the scanned image of the document is uploaded via a multipart upload which makes use of multiple upload channels to transmit multiple different parts of the image in parallel from the client device to the cloud storage, thereby reducing the amount of time required for the upload. When received by the cloud storage, the multiple parts of the image are reassembled and stored as a single file.

Once the scanned image of the document has been uploaded, the collaboration service is triggered to perform the OCR or object recognition procedures selected by the user (step 222). If the user has selected the option to generate text from the PDF image, the collaboration service performs OCR processing of the PDF and generates text corresponding to the image in the PDF. If the user has instead selected the option to recognize objects within the image, the collaboration service performs the required object recognition processing on the image and generates information identifying the recognized objects. In either case, the information generated by the processing of the PDF/image may be stored as metadata of the uploaded PDF/image (step 224) or, alternatively, this information may be stored in a separate file in the cloud storage, where the file with the OCR/object recognition data is associated with the uploaded PDF/image. After this information is stored, the PDF/image and the associated OCR/object recognition data are made available to users through the collaboration service.

Figure 3:
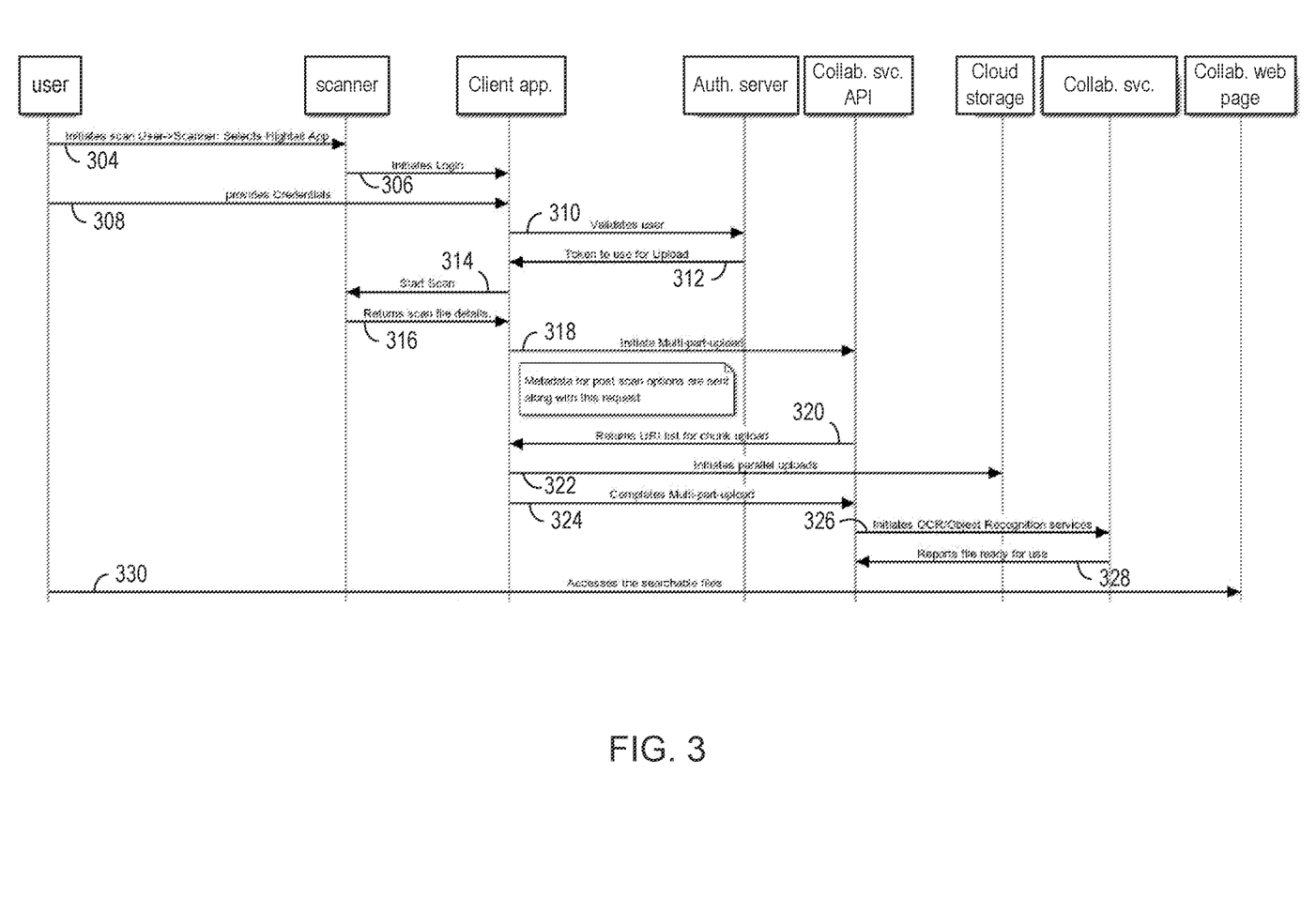
FIG. 3 is a transaction diagram illustrating the transactions that occur between the various components of the system during the automated multipart upload and processing of a document scan in accordance with some embodiments.

Referring to FIG. 3, a transaction diagram is shown to illustrate the transactions that occur between the various components of the system during the automated multipart upload and processing of a document scan in accordance with some embodiments.

First, a user initiates a scan of a particular document by a scanner (304). The user also selects a client application of a collaboration service to control the scanning and uploading of the image produced by scanning the document (304). Both of these actions may be taken within the context of a user interface of a scanning application which allows the user to indicate that the document is to be scanned, and also indicate the manner in which the document will be scanned (e.g., under the control of the client application of the collaboration service).

In the example of the figure, the user has selected the client application of the collaboration service for processing the scan, so the scanner initiates a process for the user to login to the client application (306). During this process, the user is prompted to input credentials for the user's validation (308). The provided credential information is transmitted by the client application of the collaboration service to an authentication server in order to validate the user (310). The authentication server validates the user and returns a token to the client application of the collaboration service that is to be used during the uploading and processing of the image of the scanned document (312).

Once the client application of the collaboration service receives the token from the authentication server, the client application transmits an indication to the scanner to begin the physical process of scanning the document (314). The scanner scans the document to generate a corresponding image and transmits the generated image to the client application (316).

When the client application of the collaboration service receives the generated image of the scanned document, the client application sends an application programming interface (API) call to an API of the collaboration service in order to initiate a multipart upload of the image (318). In response to receiving the API call from the client application, the collaboration service API returns to the client application a uniform resource identifier (URI) list for the multiple parts, or chunks, of the image of the document (320). The client application of the collaboration service then initiates the physical upload of the chunks of the document image, where the uploads of multiple chunks are performed in parallel (322). When the client application has finished uploading the individual chunks of the image, the client application transmits a message to the collaboration service API indicating that the upload of all of the chunks of the document image has been completed (324).

After the client application of the collaboration service confirms that the multipart upload has been completed, the collaboration service API notifies the collaboration service and initiates the processing of the image (now stored on the cloud storage) to perform OCR processing or object recognition on the image (326). When the collaboration service has finished processing the image (including storing the recognized text and/or objects with the image in the cloud storage), the collaboration service returns a notification to the collaboration service API indicating that the processing is complete (328). The user can then access the scanned image and the recognized text and/or objects via the collaboration service website (330).

Figure 4:
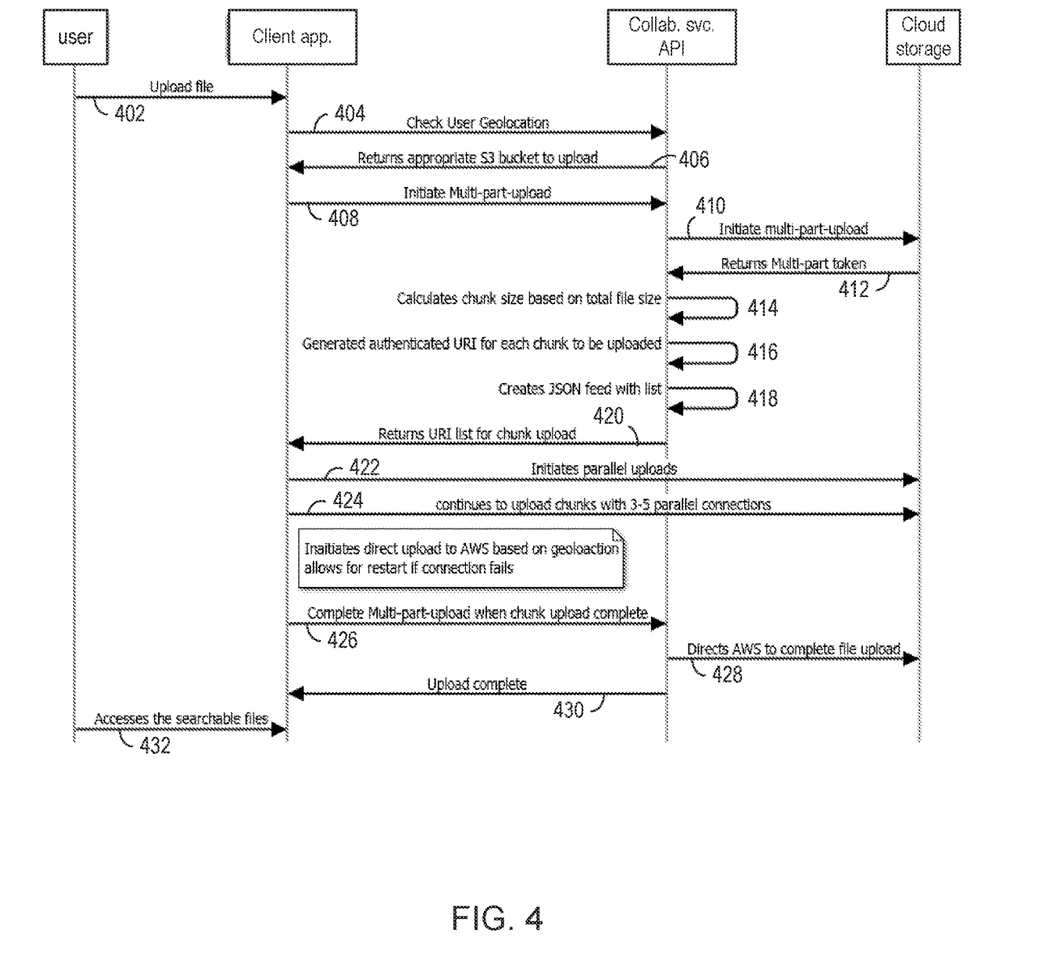
FIG. 4 is a transaction diagram illustrating in more detail the transactions that occur between the user, client application, collaboration services API and cloud storage during the automated multipart upload and processing of a document scan in accordance with some embodiments.

Referring to FIG. 4, a transaction diagram is shown to illustrate in more detail the transactions that occur between the user, client application, collaboration services API and cloud storage during the automated multipart upload and processing of a document scan in accordance with some embodiments. This figure expands on the part of the upload process represented by transactions 316-324 of FIG. 3.

Initially, a user uploads an image file to the client application of a collaboration service (402). The image file is, in this example, a file generated by a scanner which scans a document. When the client application of the collaboration service receives the file, it contacts the collaboration service API to check the geolocation of the user (404). The collaboration service API then returns to the client application a particular bucket or container of the cloud storage in which the image is to be stored (406). The client application of the collaboration service then initiates with the collaboration service API the multipart upload of the image (408).

After the client application initiates the multipart upload with the collaboration service API, the collaboration service API initiates the upload with the cloud storage by sending a message to the cloud storage (410). In response to the message from the collaboration service API, the cloud storage returns a token for use in the multipart upload (412). The collaboration service API then calculates the size of each chunk of the image based on the total file size of the image (414), generates an authenticated URI for each chunk of the file that is to be uploaded (416) and creates a JSON feed with the list of the file chunks (418). The URI list generated by the collaboration service API is then returned to the client application for the collaboration service (420).

When the client application of the collaboration service has received the URI list from the collaboration service API, the client application initiates parallel uploads to the cloud storage (422). The client application uploads the individual chunks to the cloud storage using multiple (e.g., 3-5) parallel connections, so that different chunks of the file can be uploaded concurrently (424). When the client application has finished uploading the chunks of the image file via the parallel connections to the cloud storage, the client application sends a notification to the collaboration service API (426). The collaboration service API then directs the cloud storage to complete the file upload (428). Finally, the collaboration service API sends a message to the client application of the collaboration service notifying the client application that the upload of the image file is complete (430).

Although not shown in FIG. 4, after the upload of the image file has been completed, the collaboration service API initiates the OCR and/or object recognition processes of the collaboration service. This results in the generation of the text information and/or recognized object information for the uploaded image. The collaboration service then stores this information with the scanned image on the cloud storage. The user can thereafter access the scanned image and associated text and/or object information, including searching the scanned image (or more specifically the text/object information associated with the scanned image).

There may be many alternative embodiments. For instance, one embodiment comprises a method that includes selecting one or more processing options for a document to be uploaded and processed and scanning the document with a client device or a scanner connected to the client device to generate a digital file. The client device initiates an upload of the digital file to a remotely located repository, which may be a cloud repository, and conveys indications of the processing options to the remotely located repository. In response to completing the upload of the digital file to the remotely located repository, the digital file is automatically processed according to the one or more processing options.

In some embodiments, the method may include logging in to an upload application on the client device. Conveying the processing options may comprise making an API call from the upload app to an API of the remotely located repository. The method may also include validating a user of the upload application by making an API call to the API of the remotely located repository.

In some embodiments, the upload may comprise separating the digital file into multiple parts and uploading the multiple parts in parallel to the remotely located repository. The upload may be initiated by making an API call to an API of the remotely located repository or a collaboration service. The API call conveys the indications of the processing options to the remotely located repository or collaboration service. The API of the repository or collaboration service may automatically process the digital file according to the processing options in response to completing the upload of the digital file in order to produce metadata corresponding to the digital file. The metadata comprises at least one of: recognized text; and identifiers of recognized image objects. The API of the repository or collaboration service may store the metadata with the digital file in the remotely located repository.

In some embodiments, the method further comprises accessing the digital file which has been uploaded to the remotely located repository and searching the metadata stored with the digital file in the remotely located repository.

An alternative embodiment comprises a computer program product including a non-transitory computer-readable medium storing instructions executable by one or more processors to perform an automated upload and processing method. The method includes selecting one or more processing options for a document to be uploaded and processed, obtaining a digital file comprising a scanned image of the document (e.g., from a scanner), and initiating an upload of the digital file to a remotely located repository. The digital file is separated into multiple parts and the multiple parts are uploaded in parallel to the remotely located repository. Indications of the processing options are also conveyed to the remotely located repository. In response to completing the upload of the digital file to the remotely located repository, the digital file is automatically processed according to the processing options, where processing the digital file produces metadata corresponding to the digital file, the metadata including recognized text and/or identifiers of recognized image objects. The metadata is stored with the digital file in the remotely located repository.

In some embodiments, the instructions are further executable to validate a user of the upload application, which includes receiving one or more user credentials, accessing an API of an authentication service, providing the user credentials to the API of the authentication service, and receiving an authentication token for the uploads of the multiple chunks.

Another alternative embodiment comprises a system for automated upload and processing of scanned images. The system uses a client device which is configured to provide an upload interface of an upload application. The client device receives user input selecting one or more processing options for a digital file to be uploaded (the digital file corresponding to a scanned document), where the processing options include performing optical character recognition on images contained in the digital file, and/or performing image object recognition on the images contained in the digital file. The client device obtains the digital file of the scanned document (e.g., from an attached scanner) and makes an API call to an API of a cloud based repository or collaboration system. The API call initiates an upload of the digital file to the repository or collaboration system, where the upload includes separating the digital file into multiple chunks, initiating parallel uploads of at least a portion of the multiple chunks, reconstructing the digital file from the multiple chunks, and storing the digital file in the cloud based repository. The client application also transmits the selected processing options to a cloud based recognition service (e.g., the collaboration service), for performing processing on the digital file. The processing includes optical character recognition and/or object recognition and storing the metadata corresponding to the digital file with the digital file, where the metadata results from the processing.

In some embodiments, the client device is further configured to access the digital file and the corresponding metadata, and to search the metadata. The client device may also be configured to validate a user of the upload application by receiving user input containing one or more user credentials and accessing an API of an authentication service to provide the user credentials to the authentication service. The client device then receives an authentication token for the uploads of the multiple chunks.

Embodiments of the technology may be implemented on a computing system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer systems may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages), a server program configured to extend the functionality of the page processing program or other server code. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered. Application server code can be executable to receive requests from client computers, generate server page files from a set of page assets (e.g., complete web pages, page fragments, scripts or other assets) and return page files in response. A page file may reference additional resources, such as style sheets, images, videos, audio, scripts or other resources at a server computer system or at other network locations, such as at additional server systems.

According to some embodiments, a network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method of uploading scanned documents to a cloud based collaboration service comprising:
    selecting, at a client device, one or more processing options for a document to be uploaded and processed by a cloud based collaboration service, the processing options comprising one or more of recognizing text within the document, or recognizing objects within an image;
    in response to the selecting the one or more processing options, scanning, by the client device, the document to generate a digital file;
    in response to the selecting the one or more processing options and the scanning, initiating, by the client device, an upload of the digital file to a remotely located repository of the cloud based collaboration service for processing by the cloud based collaboration service in accordance with the selected one or more processing options;
    conveying, by the client device, indications of the selected one or more processing options to the remotely located repository of the cloud based collaboration service;
    in response to completing the upload of the digital file to the remotely located repository, the remotely located repository of the cloud based collaboration service automatically processing the digital file according to the one or more processing options selected at the client device; and
    accessing, by the user, the processed digital file from a website of the cloud based collaboration service.

2. The method of claim 1, wherein the remotely located repository comprises a cloud repository.

3. The method of claim 1, further comprising logging in to an upload application on the client device.

4. The method of claim 3, wherein conveying the one or more processing options comprises making an API call from the upload application to an API of the remotely located repository.

5. The method of claim 4, further comprising validating, by the API of the remotely located repository, a user of the upload application to use the API of the remotely located repository.

6. The method of claim 1, wherein the upload comprises separating the digital file into multiple parts and uploading the multiple parts to the remotely located repository.

7. The method of claim 6, wherein at least a portion of the multiple parts of the digital file are uploaded to the remotely located repository in parallel.

8. The method of claim 1, wherein initiating the upload of the digital file comprises making an API call to an API of the remotely located repository, and wherein the API call conveys the indications of the one or more processing options to the remotely located repository.

9. The method of claim 1, wherein initiating the upload of the digital file comprises making an API call to an API of the cloud based collaboration service which processes the digital file according to the one or more processing options to the remotely located repository.

10. The method of claim 1, wherein the API of the collaboration service:
automatically processes, in response to completing the upload of the digital file to the remotely located repository, the digital file according to the one or more processing options to produce metadata corresponding to the digital file, the metadata comprising at least one of: recognized text; and identifiers of recognized image objects; and
stores the metadata with the digital file in the remotely located repository.

11. The method of claim 1, further comprising searching the metadata stored with the digital file in the remotely located repository.

12. A computer program product for uploading scanned documents to a cloud based collaboration service comprising a non-transitory computer-readable medium storing instructions executable by one or more processors to perform:
selecting one or more processing options for a document to be uploaded and processed by a cloud based collaboration service;
in response to the selecting the one or more processing options, obtaining a digital file comprising a scanned image of the document;
in response to the selecting the one or more processing options and obtaining the digital file, initiating an upload of the digital file to a remotely located repository of the cloud based collaboration service, separating the digital file into multiple parts, and uploading the multiple parts to the remotely located repository in accordance with a URL list;
conveying indications of the one or more processing options to the remotely located repository of the cloud based collaboration service; and
in response to completing the upload of the digital file to the remotely located repository of the cloud based collaboration service, automatically processing by the cloud based collaboration service the digital file according to the one or more processing options, wherein processing the digital file according to the one or more processing options produces metadata corresponding to the digital file, the metadata comprising at least one of recognized text and identifiers of recognized image objects, and wherein the metadata is stored with the digital file in the remotely located repository of the cloud based collaboration service.

13. The computer program product of claim 12, wherein the instructions are further executable to validate a user of an upload application, including:
receiving one or more user credentials;
accessing an API of an authentication service;
providing the one or more user credentials to the API of the authentication service; and
receiving an authentication token for the uploads of the multiple chunks.

14. The computer program product of claim 12, wherein the instructions are further executable to obtain the digital file of the scanned document by receiving the digital file from a scanning device.

15. A system for automated upload and processing of scanned images, the system comprising:
a client device configured to:
provide an upload interface of an upload application;
receive user input selecting one or more processing options for a digital file to be uploaded, the digital file corresponding to a scanned document, wherein the processing options include one or more of: performing optical character recognition (OCR) on one or more images contained in the digital file; and performing image object recognition on the one or more images contained in the digital file;
in response to receiving the user input selecting the one or more processing options, obtain the digital file of the scanned document;
in response to receiving the user input selecting the one or more processing options and obtaining the digital file, make an API call to an API of a cloud based repository of a cloud based collaborative recognition service, the API call initiating an upload of the digital file to a cloud based repository of the cloud based collaborative recognition service, wherein the upload comprises separating the digital file into multiple chunks, initiating parallel uploads of at least a portion of the multiple chunks in accordance with a URI list provided by the API, reconstructing the digital file from the multiple chunks, and storing the digital file in the cloud based repository of the cloud based collaborative recognition service;
transmit the one or more processing options to the cloud based collaborative recognition service, for performing processing on the digital file in the cloud based repository, the processing including: at least one of the optical character recognition and the object recognition; and storing metadata corresponding to the digital file, the metadata resulting from the processing in the cloud based repository, with the digital file; and
accessing, by a user, the processed digital file from a website of the cloud based collaborative recognition service.

16. The system of claim 15, wherein the client device is further configured to search the metadata.

17. The system of claim 15, wherein the client device is further configured to validate a user of the upload application.

18. The system of claim 17, wherein the client device is further configured to receive user input containing one or more user credentials.

19. The system of claim 18, wherein the client device is further configured to access an API of an authentication service; provide the one or more user credentials to the API of the authentication service; and receive an authentication token for the uploads of the multiple chunks.

20. The system of claim 15, wherein the client device is further configured to obtain the digital file of the scanned document by receiving the digital file from a scanning device.

\* \* \* \* \*